United States Patent
Yavatkar et al.

(10) Patent No.: US 6,728,265 B1
(45) Date of Patent: Apr. 27, 2004

(54) CONTROLLING FRAME TRANSMISSION

(75) Inventors: Raj Yavatkar, Haifa (IL); Charles Tai, Haifa (IL); Uri Elzur, Zichron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/365,328

(22) Filed: Jul. 30, 1999

(51) Int. Cl.[7] .............................. H04J 3/16; H04J 3/22
(52) U.S. Cl. ................ 370/468; 370/395.4; 370/395.42
(58) Field of Search ................................ 370/468, 230, 370/232, 233, 235, 252, 253, 455, 412, 413, 415, 417, 444, 231, 428, 229, 234, 395.21, 395.4, 395.41, 395.42, 395.43, 503, 509, 510, 512

(56) References Cited

U.S. PATENT DOCUMENTS

| | | | | |
|---|---|---|---|---|
| 5,485,457 A | * | 1/1996 | Aramaki | 370/238 |
| 5,521,923 A | * | 5/1996 | Willmann et al. | 370/412 |
| 5,548,590 A | * | 8/1996 | Grant et al. | 370/429 |
| 5,640,389 A | * | 6/1997 | Masaki et al. | 370/418 |
| 5,699,519 A | * | 12/1997 | Shiobara | 709/235 |
| 5,724,513 A | * | 3/1998 | Ben-Nun et al. | 709/235 |
| 5,757,771 A | * | 5/1998 | Li et al. | 370/235 |
| 5,818,818 A | * | 10/1998 | Soumiya et al. | 370/252 |
| 5,844,890 A | * | 12/1998 | Delp et al. | 370/230 |
| 5,845,043 A | * | 12/1998 | Yanagihara | 386/109 |
| 5,859,835 A | * | 1/1999 | Varma et al. | 370/229 |
| 5,870,629 A | * | 2/1999 | Borden et al. | 710/44 |
| 5,898,668 A | * | 4/1999 | Shaffer | 370/230 |
| 5,926,458 A | * | 7/1999 | Yin | 370/230 |
| 5,982,748 A | * | 11/1999 | Yin et al. | 370/230 |
| 5,999,534 A | * | 12/1999 | Kim | 370/395.42 |
| 6,023,453 A | * | 2/2000 | Ruutu et al. | 370/229 |
| 6,067,301 A | * | 5/2000 | Aatresh | 370/232 |
| 6,104,700 A | * | 8/2000 | Haddock et al. | 370/418 |
| 6,108,307 A | * | 8/2000 | McConnell et al. | 370/235 |
| 6,205,150 B1 | * | 3/2001 | Ruszczyk | 370/412 |
| 6,205,151 B1 | * | 3/2001 | Quay et al. | 370/416 |
| 6,377,546 B1 | * | 4/2002 | Guerin et al. | 370/230 |
| 6,377,583 B1 | * | 4/2002 | Lyles et al. | 370/412 |
| 6,389,019 B1 | * | 5/2002 | Fan et al. | 370/395.42 |
| 6,570,876 B1 | * | 5/2003 | Aimoto | 370/389 |

OTHER PUBLICATIONS

Uri Elzur et al., U.S. patent application Ser. No. 09/364,374, filed Jul. 30. 1999, entitled "Storing a Frame Header".

Uri Elzur et al., U.S. patent application Ser. No. 09/364,195, filed Jul. 30, 1999, entitled "Coordinating Authentication and Encryption/Decryption".

Ronen Chayat, U.S. patent application Ser. No. 09/364,375, filed Jul. 30, 1999, entitled "Selectively Transmitting Packets".

* cited by examiner

*Primary Examiner*—Phirin Sam
(74) *Attorney, Agent, or Firm*—Trop, Pruner & Hu, P.C.

(57) ABSTRACT

A method and apparatus for use with a computer system are disclosed. A packet is received that includes a header. The header indicates at least one characteristic that is associated with a layer of a protocol stack, and the layer is hierarchically no lower than a network layer. The packet is parsed in hardware to extract the characteristic(s), and the packet is processed based on the parsing. The computer system may be capable of executing software of a protocol stack to extract the characteristic(s) of the packet, and the apparatus may include an interface and a circuit. The interface may be adapted to receive the packet, and the circuit may be adapted to parse the header to extract the characteristic(s) without causing the computer to execute the software and process the packet based on the extracted characteristic(s).

14 Claims, 11 Drawing Sheets

CONTROLLING FRAME TRANSMISSION

BACKGROUND

The invention relates to controlling frame transmission, for example in connection with a network controller.

Referring to FIG. 1, a server 12 may communicate with a client 10 by transmitting packets 8 of information over a network 18 pursuant to a network protocol. As an example, the network protocol may be a Transmission Control Protocol/Internet Protocol (TCP/IP), and as a result, the client 10 and server 12 may implement protocol stacks, such as TCP/IP stacks 17 and 19, respectively. For the client 10 (as an example), the TCP/IP stack 17 conceptually divides the client's software and hardware protocol functions into five hierarchical layers 16 (listed in hierarchical order): an application layer 16a (the highest layer), a transport layer 16b, a network layer 16c, a data link layer 16d and a physical layer 16e (the lowest layer).

More particularly, the physical layer 16e typically includes hardware (a network controller, for example) that establishes physical communication with the network 18 by generating and receiving signals (on a network wire 9) that indicate bits of the packets 8. The physical layer 16e recognizes bits and does not recognize packets, as the data link layer 16d performs this function. In this manner, the data link layer 16d typically is both a software and hardware layer that may, for transmission purposes, cause the client 10 to package the data to be transmitted into the packets 8. For purposes of receiving packets 8, the data link layer 16d may, as another example, cause the client 10 to determine the integrity of the incoming packets 8 by determining if the incoming packets 8 generally conform to predefined formats and if the data of the packets comply with checksums (or cyclic redundancy check (CRC)) of the packets, for example.

The network layer 16c typically is a software layer that is responsible for routing the packets 8 over the network 18. In this manner, the network layer 16c typically causes the client 10 to assign and decode Internet Protocol (IP) addresses that identify entities that are coupled to the network 18, such as the client 10 and the server 12. The transport layer 16b typically is a software layer that is responsible for such things as reliable data transfer between two endpoints and may use sequencing, error control and general flow control of the packets 8 to achieve reliable data transfer. The transport layer 16b may cause the client 10 to implement the specific network protocol, such as the TCP/IP protocol or a User Datagram Protocol (UDP), as examples. The application layer 16a typically includes network applications that, upon execution, cause the client 10 to generate and receive the data of the packets 8.

Referring to FIG. 2, a typical packet 8 may include an IP header 20 that indicates such information as the source and destination IP addresses for the packet 8. The packet 8 may include a security header 23 that indicates a security protocol (e.g., IPSec) and attributes of the packet 8 and a protocol header 22 (a TCP or an UDP protocol header, as examples) that is specific to the transport protocol being used. As an example, a TCP protocol header might indicate a TCP destination port and a TCP source port that uniquely identify the applications that cause the client 10 and server 12 to transmit and receive the packets 8. The packet 8 may also include a data portion 24, the contents of which are furnished by the source application. The packet 8 may include additional information, such as a trailer 26, for example, that is used in connection with encryption of the data portion 24.

Referring to FIG. 3, as an example, a TCP protocol header 22a may include a field 30 that indicates the TCP source port address and a field 32 that indicates the TCP destination port address. Another field 34 of the TCP protocol header 22a may indicate a sequence number that is used to concatenate received packets of an associated flow. In this manner, packets 8 that have the same IP addresses, transport layer port addresses and (security attributes) are part of the same flow, and the sequence number indicates the order of a particular packet 8 in that flow. Thus, as an example, a packet 8 with a sequence number of "244" typically is transmitted before a packet 8 with a sequence number of "245."

The TCP protocol header 22a may include a field 38 that indicates a length of the header 22a, a field 44 that indicates a checksum for the bytes in the header 22a and a field 40 that indicates control and status flags.

Because of bandwidth limitations, networks may provide different quality of service or class of service for different users or different applications. The data may flow through the network in a controlled fashion based on the specific class of service policy or a quality of service agreement. These policies and agreements are generally implemented in existing systems using software. Thus, the granularity of the pacing of the data through the network is limited by the speed possible with software.

Thus, there is a continuing need for a way of controlling frame transmission which allows the data pace through the network to be increased.

SUMMARY

In one embodiment of the invention, a method for controlling frame transmission includes assigning a time based transmission priority to a plurality of frames. The time is monitored and a frame is selected for transmission based on the time and the time based transmission priority.

BRIEF DESCRIPTION OF THE DRAWING

FIG. 5b is a flow chart for software for modifying the queues of FIG. 5a.

DETAILED DESCRIPTION

Figure 1:
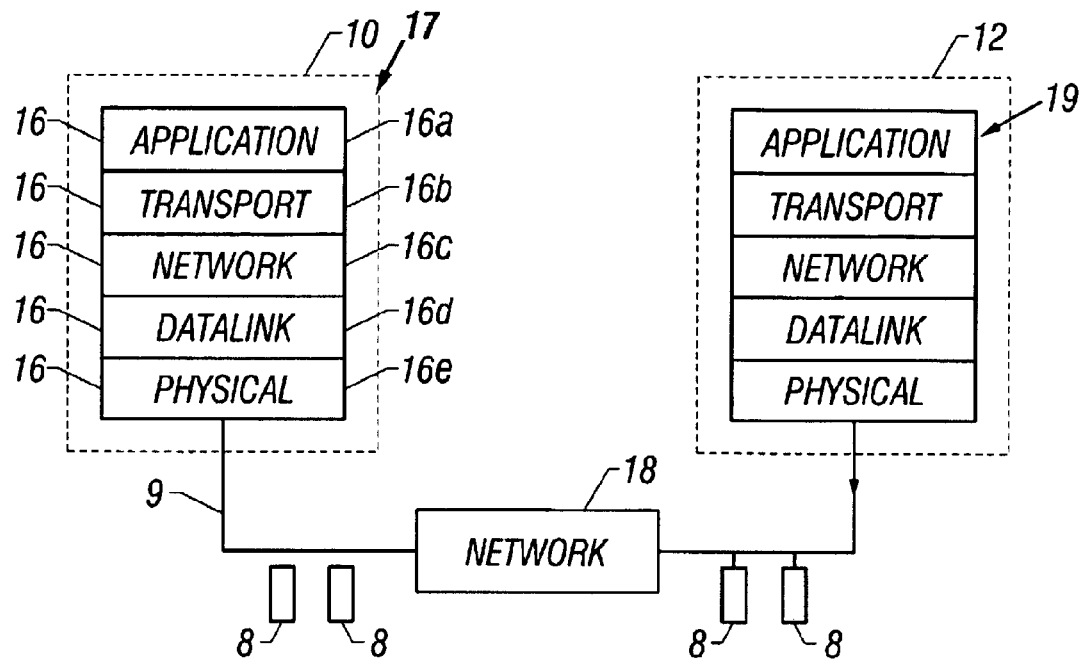
FIG. 1 is a schematic diagram of a network of computers according to the prior art.
Figure 2:
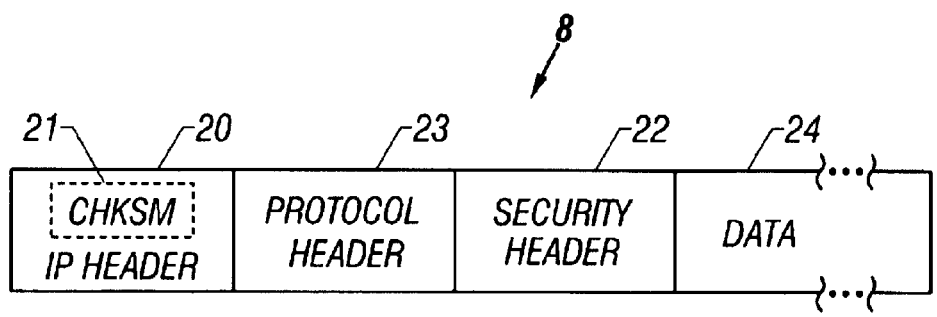
FIG. 2 is a schematic diagram of a packet transmitted over the network shown in FIG. 1.
Figure 3:
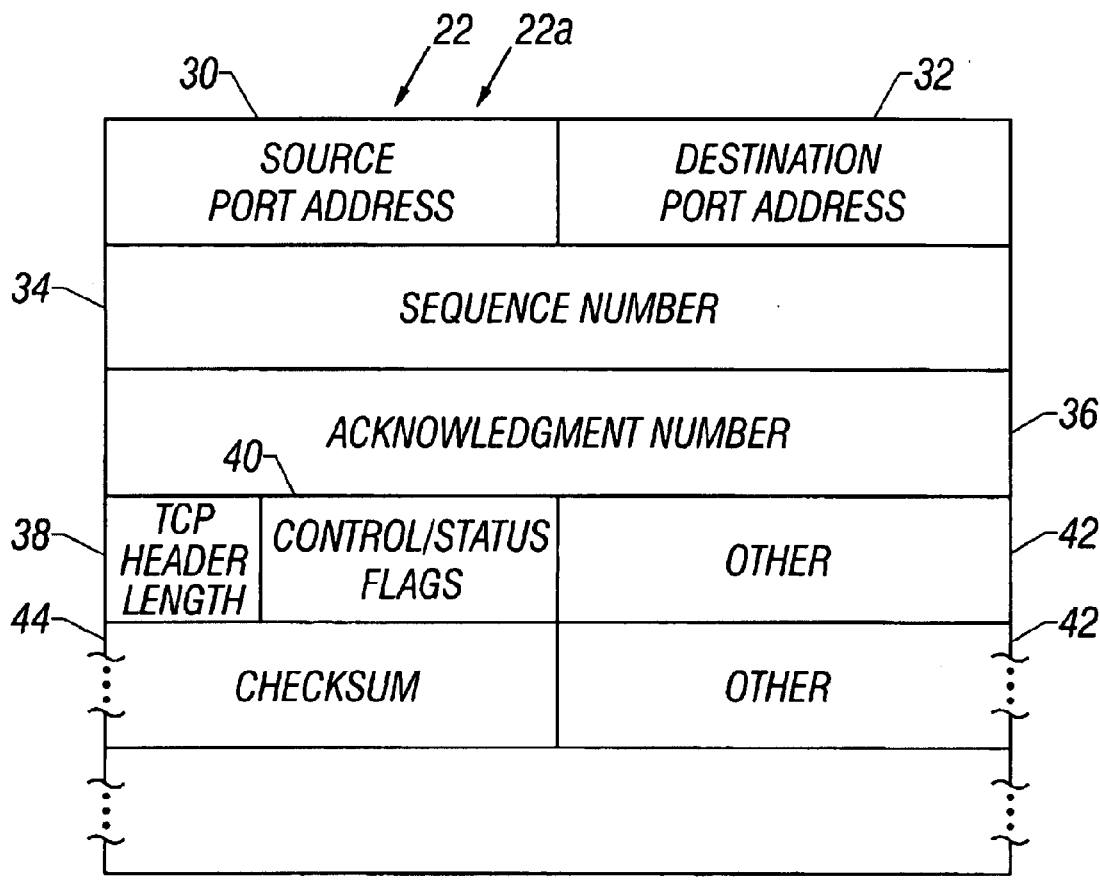
FIG. 3 is an illustration of an exemplary protocol header of the packet of FIG. 2.
Figure 4:
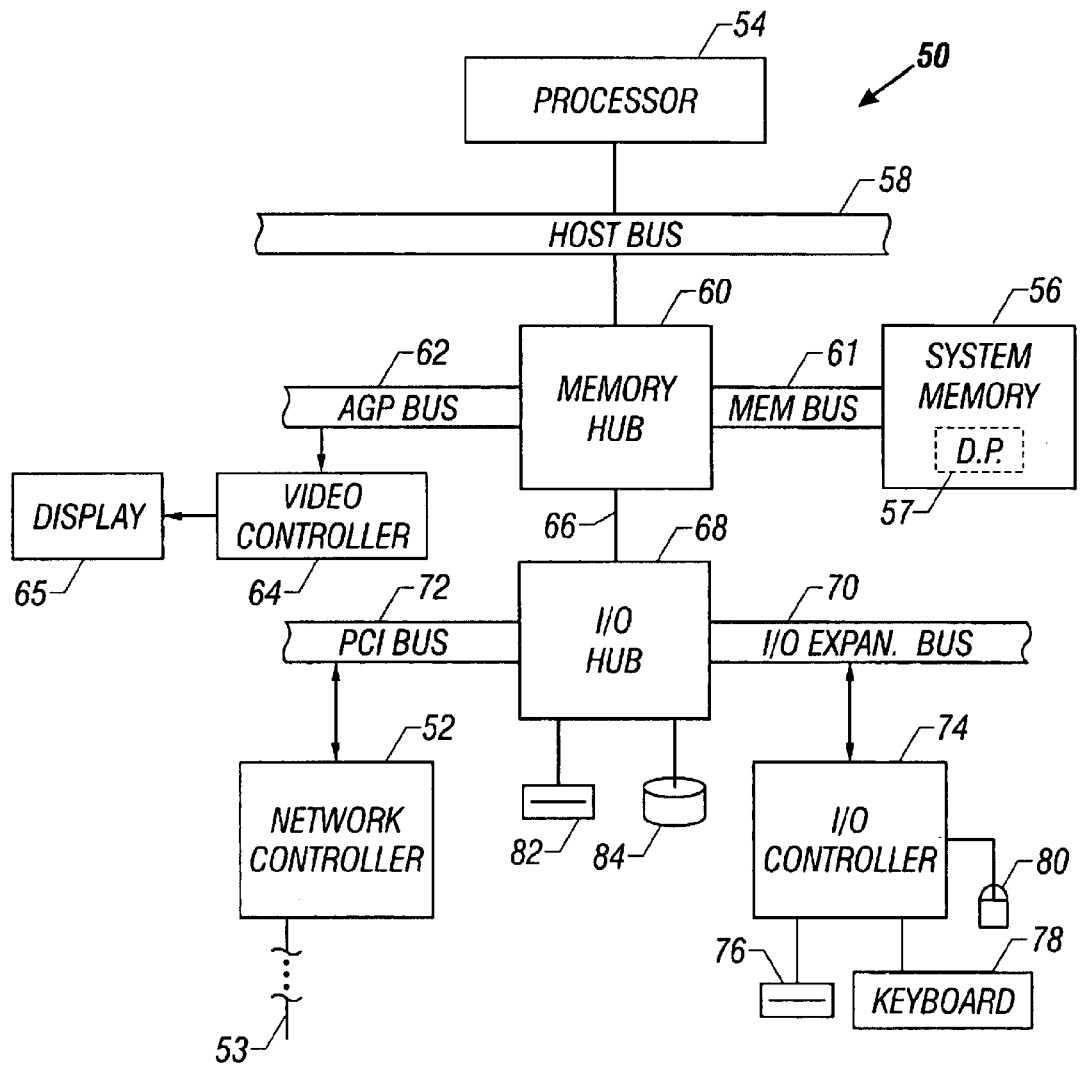
FIG. 4 is a schematic diagram of a computer system according to an embodiment of the invention.

Referring to FIG. 4, an embodiment 50 of a computer system in accordance with the invention includes a network controller 52 (a local area network (LAN) controller, for example) that communicates packets of information with other networked computer systems via at least one network wire 53. Unlike conventional network controllers, the network controller 52 may be adapted in one embodiment of the invention, to perform functions that are typically implemented by a processor (a central processing unit (CPU), for example) that executes one or more software layers (a network layer and a transport layer, as examples) of a protocol stack (a TCP/IP stack, for example). As an example, these functions may include parsing headers of incoming packets to obtain characteristics (of the packet) that typically are extracted by execution of the software layers. The characteristics, in turn, may be used to identify a flow that is associated with the packet, as further described below.

Figure 5:
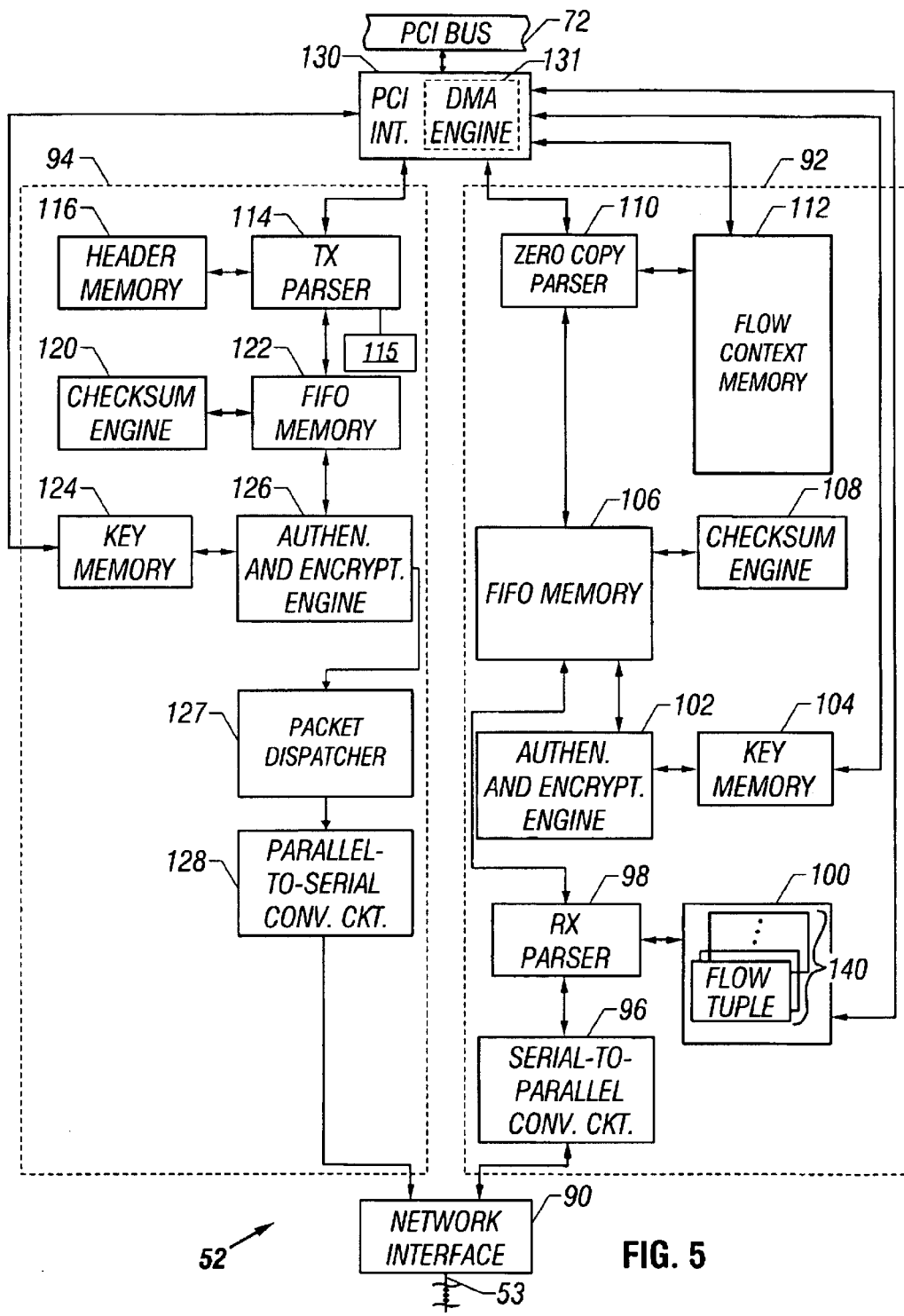
FIG. 5 is a schematic diagram of a network controller of FIG. 4.

Referring to FIG. 5, the network controller 52 may include hardware, such as a receive path 92, to perform traditional software functions to process packets that are received from the network. For example, the receive path 92 may include a receive parser 98 to parse a header of each packet to extract characteristics of the packet, such as characteristics that associate a particular flow with the packet. Because the receive path 92 may be receiving incoming packets from many different flows, the receive path 92 may include a memory 100 that stores entries, or flow tuples 140, that uniquely identify a particular flow. In this manner, the receive parser 98 may interact with the memory 100 to compare parsed information from the incoming packet with the stored flow tuples 140 to determine if the flow is detected, or "flow tuple hit," occurs. If a flow tuple hit occurs, the receive parser 98 may indicate this event to other circuitry (of the controller 52) that processes the packet based on the detected flow, as further described below.

Figure 6:
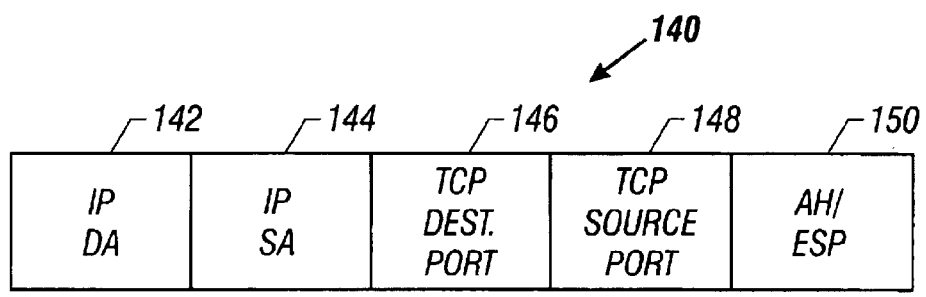
FIG. 6 is an illustration of a flow tuple stored in memory of the network controller of FIG. 5.

Referring also to FIG. 6, each flow tuple 140 may include fields that identify characteristics of a particular flow. As an example, in some embodiments, at least one of the flow tuples 140 may be associated with a Transmission Control Protocol (TCP), a User Datagram Protocol (UDP), or a Realtime Transport protocol (RTP), as examples. The flow tuple 140 may include a field 142 that indicates an internet protocol (IP) destination address (i.e., the address of the computer system to receive the packet); a field 144 that indicates an IP source address (i.e., the address of a computer system to transmit the packet); a field 146 that indicates a TCP destination port (i.e., the address of the application that caused generation of the packet); a field 148 that indicates a TCP source port (i.e., the address of the application that is to receive the packet); and a field 150 that indicates security/authentication attributes of the packet. Other flow tuples 140 may be associated with other network protocols, such as a User Datagram Protocol (UDP), for example. The above references to specific network protocols are intended to be examples only and are not intended to limit the scope of the invention. Additional flow tuples 140 may be stored in the memory 100 and existing flow tuples 140 may be removed from the memory 100 via a driver program 57.

If the receive parser 98 recognizes (via the flow tuples 140) the flow that is associated with the incoming packet, then the receive path 92 may further process the packet. If the receive parser 98 does not recognize the flow, then the receive path 92 may pass the incoming packet via a Peripheral Component Interconnect (PCI) interface 130 to software layers of a TCP/IP stack of the computer system 50 for processing. The PCI Specification is available from The PCI Special Interest Group, Portland, Oreg. 97214. Other bus interfaces may also be used. In this manner, in some embodiments, the computer system 50 may execute an operating system that provides at least a portion of some layers (network and transport layers, for example) of the protocol stack.

In some embodiments, even if the receive parser 98 recognizes the flow, additional information may be needed before receive path 92 further processes the incoming packet 52. For example, an authentication/encryption engine 102 may authenticate and/or decrypt the data portion of the incoming packet based on the security attributes that are indicated by the field 150 (see FIG. 6). In this manner, if the field 150 indicates that the data portion of the incoming packet is encrypted, then the engine 102 may need a key to decrypt the data portion.

For purposes of providing the key to the engine 102, the network controller 52 may include a key memory 104 that stores different keys that may be indexed by the different associated flows, for example. Additional keys may be stored in the key memory 104 by execution of the driver program 57, and existing keys may be removed from the key memory 104 by execution of the driver program 57. In this manner, if the engine 102 determines that the particular decryption key is not stored in the key memory 104, then the engine 102 may submit a request (via the PCI interface 130) to the driver program 57 (see FIG. 4) for the key. In this manner, the driver program 57, when executed, may furnish the key in response to the request and interact with the PCI interface 130 to store the key in the key memory 104. In some embodiments, if the key is unavailable (i.e., the key is not available from the driver program 57 or is not stored in the key memory 104), then the engine 102 does not decrypt the data portion of the packet. Instead, the PCI interface 130 stores the encrypted data in a predetermined location of a system memory 56 (see FIG. 4) so that software of one or more layers of the protocol stack may be executed to decrypt the data portion of the incoming packet.

Figure 7:
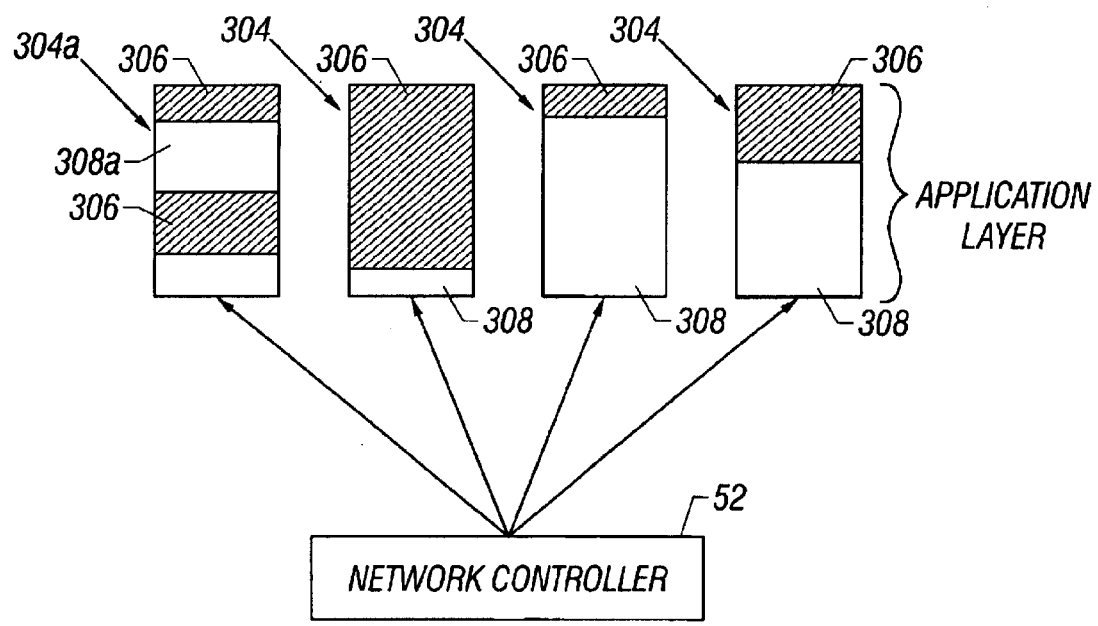
FIG. 7 is a schematic diagram illustrating the transfer of packet data according to an embodiment of the invention.

After the parsing, the processing of the packet by the network controller 52 may include bypassing the execution of one or more software layers of the protocol stack. For example, the receive path 92 may include a zero copy parser 110 that, via the PCI interface 130, copies data associated with the packet into a memory buffer 304 (see FIG. 7) that is associated with the application. In this manner, several applications may have associated buffers for receiving the packet data. The operating system creates and maintains the buffers 304 in a virtual address space, and the operating system reserves a multiple number of physical four kilobyte (KB) pages for each buffer 304. The operating system also associates each buffer with a particular application. This arrangement is to be contrasted to conventional arrangements that may use intermediate buffers to transfer packet data from the network controller to applications, as described below.

Figure 8:
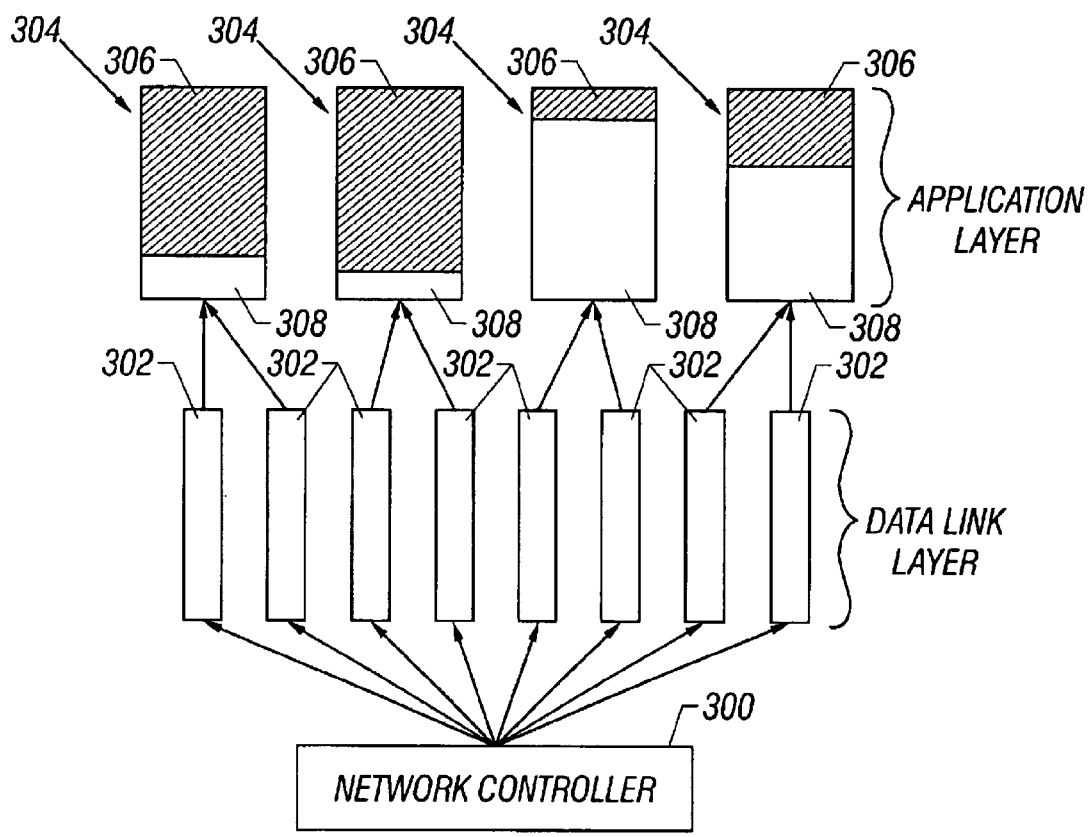
FIG. 8 is a schematic diagram illustrating the transfer of packet data between layers of the network stack of the prior art.

Referring to FIG. 8, for example, a typical network controller 300 does not directly transfer the packet data into the buffers 304 because the typical network controller 300 does not parse the incoming packets to obtain information that identifies the destination application. Instead, the typical network controller 300 (under the control of the data link layer, for example) typically transfers the data portion of the packet into packet buffers 302 that are associated with the network layer. In contrast to the buffers 304, each buffer 302 may have a size range of 64 to 1518 bytes. The execution of the network layer subsequently associates the data with the appropriate applications and causes the data to be transferred from the buffers 302 to the buffers 304.

Referring back to FIG. 7, in contrast to the conventional arrangement described above, the network controller 52 may use the zero copy parser 110 to bypass the buffers 302 and copy the data portion of the packet directly into the appropriate buffer 304. To accomplish this, the zero copy parser 110 (see FIG. 5) may receive an indication of the TCP destination port (as an example) from the receive parser 98 that, as described above, extracts this information from the header. The TCP (or other layer 4 protocol, e.g., RTP) destination port uniquely identifies the application that is to receive the data and thus, identifies the appropriate buffer 304 for the packet data. Besides transferring the data portions to the buffers 304, the zero copy parser 110 may handle control issues between the network controller and the network stack and may handle cases where an incoming packet is missing, as described below.

Referring to FIG. 5, besides the components described above, the receive path 92 may also include one or more first-in-first-out (FIFO) memories 106 to synchronize the flow of incoming packets through the receive path 92. A checksum engine 108 (of the receive path 92) may be coupled to one of the FIFO memories 106 for purposes of verifying checksums that are embedded in the packets. The receive path 92 may be interfaced to a PCI bus 72 via the PCI interface 130. The PCI interface 130 may include an emulated direct memory access (DMA) engine 131. In this manner, for purposes of transferring the data portions of the packets directly into the buffers 304, the zero copy parser 110 may use one of a predetermined number (sixteen, for example) of emulated DMA channels to transfer the data into the appropriate buffer 304. In some embodiments, it is possible for each of the channels to be associated with a particular buffer 304. However, in some embodiments, when the protocol stack (instead of the zero copy parser 110) is used to transfer the data portions of the packets, the DMA engine 131 may use a lower number (one, for example) of channels for these transfers.

In some embodiments, the receive path 92 may include additional circuitry, such as a serial-to-parallel conversion circuit 96 that may receive a serial stream of bits from a network interface 90 when a packet is received from the network wire 53. In this manner, the conversion circuit 96 packages the bits into bytes and provides these bytes to the receive parser 98. The network interface 90 may be coupled to generate and receive signals to/from the wire 53.

In addition to the receive path 92, the network controller 52 may include other hardware circuitry, such as a transmit path 94, to transmit outgoing packets to the network. In the transmit path 94, the network controller 52 may include a transmit parser 114 that is coupled to the PCI interface 130 to receive outgoing packet data from the computer system 50 and form the header on the packets. To accomplish this, in some embodiments, the transmit parser 114 stores the headers of predetermined flows in a header memory 116. Because the headers of a particular flow may indicate a significant amount of the same information (port and IP addresses, for example), the transmit parser 114 may slightly modify the stored header for each outgoing packet and assemble the modified header onto the outgoing packet. As an example, for a particular flow, the transmit parser 114 may retrieve the header from the header memory 116 and parse the header to add such information as sequence and acknowledgment numbers (as examples) to the header of the outgoing packet. A checksum engine 120 may compute checksums for the IP and network headers of the outgoing packet and incorporate the checksums into the packet.

The transmit path 94 may also include an authentication and encryption engine 126 that may encrypt and/or authenticate the data of the outgoing packets. In this manner, all packets of a particular flow may be encrypted and/or authenticated via a key that is associated with the flow, and the keys for the different flows may be stored in a key memory 124. The key memory 124 may be accessed (by execution of the driver program 57, for example) via the PCI interface 130. The transmit path 94 may also include a parallel-to-serial conversion circuit 128 to serialize the data of the outgoing packets. The circuit 128 may be coupled to the network interface 90. The transmit path 94 may also include one or more FIFO memories 122 to synchronize the flow of the packets through the transmit path 94.

Figure 5A:
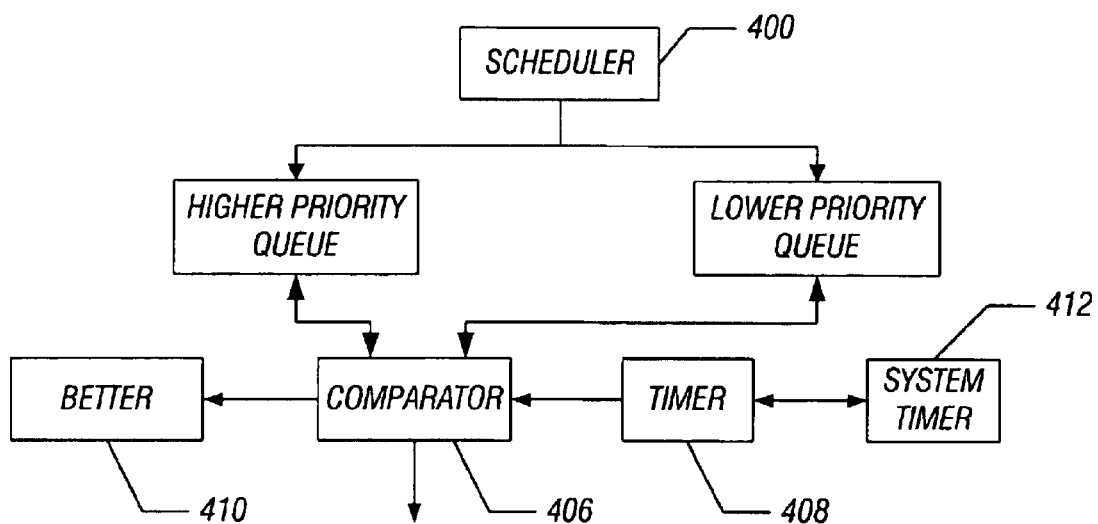
FIG. 5a is a block diagram of one embodiment of the scheduler that may be included in the transmit parser shown in FIG. 5.

Referring to FIG. 5a, a scheduler 400, which may be a software entity, may provide a time stamp to each of the frames that pass through the stack/protocol/driver. The time stamp may be based on quality of service or time or class of service. Each frame may be assigned a "time to send" i.e., a time when it will be sent. This information may be used to determine when particular data should be sent. The assigned time to send may be based on either the assigned class of service or quality of service or both. The scheduler 400 may include information about the assigned class of service or quality of service and may assign the time to send based on current bandwidth limitations. The assignment may be done by providing appropriate information in the header associated with the given frame.

When it is time stamped, the frame may be passed to one of several (or two for example) appropriate queues 402, 404. The different queues may represent different priority levels. (One of the queues may be for higher priority data and the other queue may be provided for lower priority data.) A comparator 406, which may be a hardware comparator, then compares the time stamps of the next frame for transmission to information from a timer 408. If the time corresponds to the time to send information encoded with the frame, the comparator either transmits the frame or buffers the frame in the buffer 410. That is, the comparator makes a determination of which frame to send next from multiple (or two for example) queues. For example, if the time to send information is approximately the same for both frames, the comparator may send the higher priority frame. If a time to send is well past due for the lower priority frame, the lower priority frame may be sent ahead of a higher priority frame when the lower priority frame is sufficiently outdated. If none of the frames has a time to send that is past due, the comparator may wait and send the frames on time, later on.

In this way, a frame transmission control system may be implemented in hardware. Because the system is implemented in hardware, it may provide a pacing granularity which is faster than that possible with software controlled systems. This scheme allows supporting quality of service and class of service using two queues. The scheduler may place packets for a certain quality of service on a higher priority queue and use the time stamps to ensure these packets get at least a certain bandwidth. The scheduler may place packets for a certain class of service on a lower priority queue and use the time stamps to ensure these packets get at most a certain bandwidth.

The software timer 408 used by the scheduler to set time stamps may stay in sync with the hardware timer used by the comparator to determine if frames are past due. To this end, the software may read or set the current value of a system timer 412.

Figure 5B:
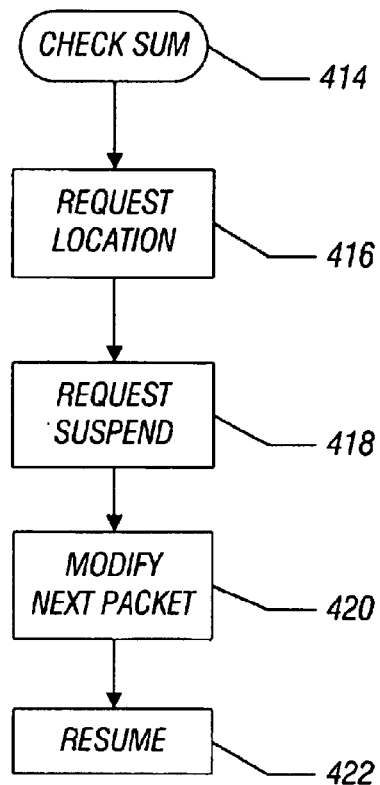

A mechanism is included by which software 414 in FIG. 5b may modify the queue of packets to be transmitted while the queue is being serviced, without disrupting the operation of the controller. Software may request the controller to indicate the location of the next packet to be processed in the queue (block 416) and to suspend processing before processing that packet (block 418). Software may then modify the next packet and the rest of the queue (block 420), given the location of the next packet, while the controller processes the current packet. Once software is done modifying the queue, it may issue a request to resume processing of packets from the queue (block 422), which may have suspended if the controller finished processing of the current packet while software was modifying the queue. Using this mechanism, software may modify the queue, for example to expedite the transmission of an urgent packet ahead of other packets, without affecting the utilization of the network bandwidth during the modification.

Figure 9:
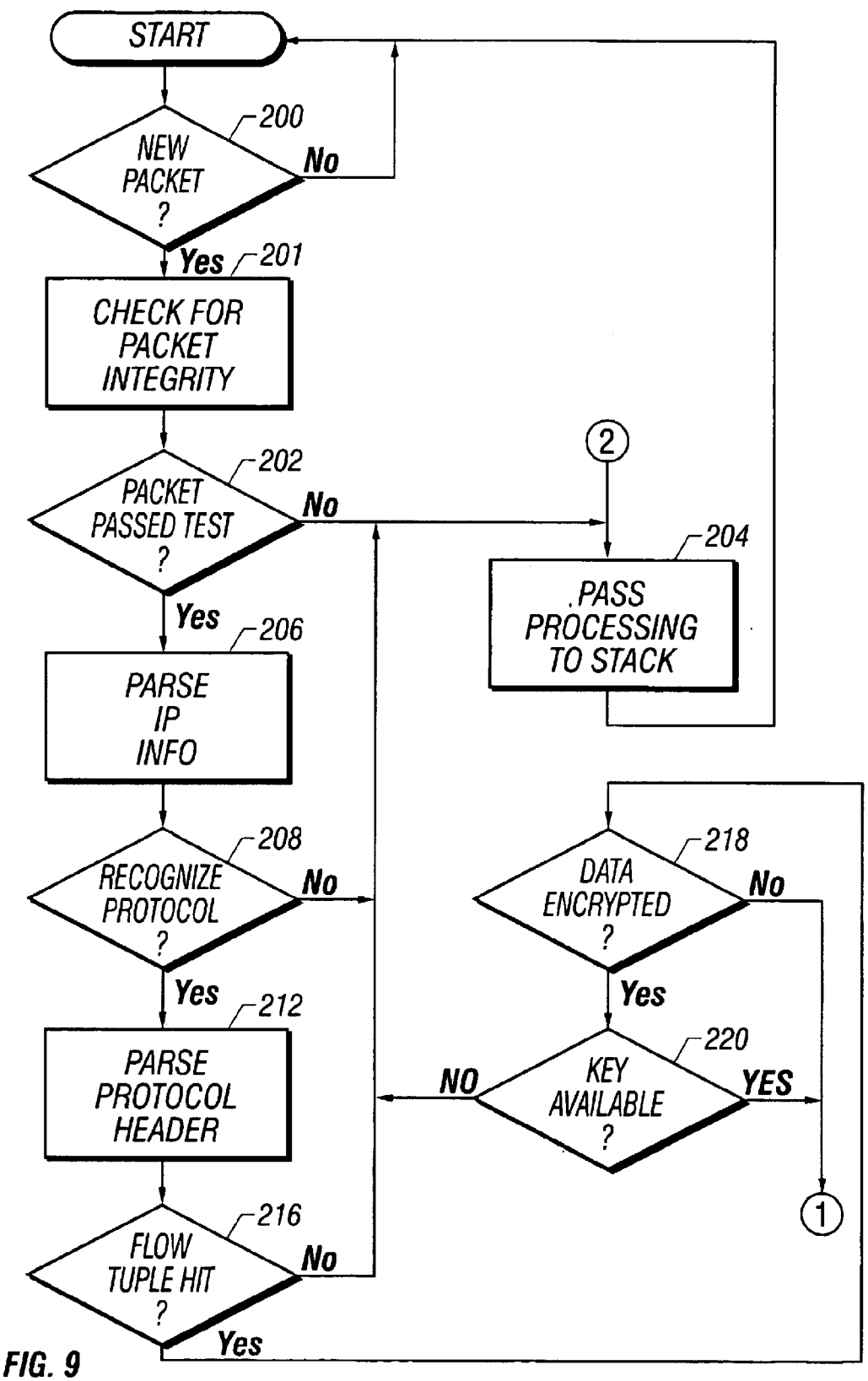
FIGS. 9, 10 and 12 are flow diagrams illustrating parsing of packet data by a receive parser of the network controller of FIG. 5.

In some embodiments, the receive parser 98 may include one or more state machines, counter(s) and timer(s), as examples, to perform the following functions. In particular, referring to FIG. 9, the receive parser 98 may continually check (block 200) for another unparsed incoming packet. When another packet is to be processed, the receive parser 98 may check the integrity of the packet, as indicated in block 201. For example, the receive parser 98 may determine if the incoming packet includes an IP header and determine if a checksum of the IP header matches a checksum that is indicated by the IP header. If the receive parser 98 determines (diamond 202) that the incoming packet passes this test, then the receive parser 98 may parse (block 206) the header to extract the IP components of a header of the packet to obtain the information needed to determine if a flow tuple hit occurs. For example, the receive parser 98 may extract the network protocol being used, IP destination and source addresses, and the port destination and source addresses. Next, the receive parser 98 may determine if the network protocol is recognized, as indicated in diamond 208. (In the case of an IPSec frame, the receive parser 98 may also check whether the received frame uses the Authentication Header (AH) or ESP transform and may compare it to the expected format stored in the tuple.) If not, then the receive parser 98 may pass (block 204) further control of the processing to the network stack.

The receive parser 98 may subsequently parse (block 212) the protocol header. As an example, if the packet is associated with the TCP/IP protocol, then the receive parser 98 may parse the TCP header of the packet, an action that may include extracting the TCP ports and security attributes of the packet, as examples. The receive parser 98 uses the parsed information from the protocol header to determine (diamond 216) if a flow tuple hit has occurred. If not, the receiver parser 98 passes control of further processing of the packet to the stack, as depicted in block 204. Otherwise, the receive parser 98 determines (diamond 218) if the data portion of the packet needs to be decrypted. If so, the receive parser 98 determines if the associated key is available in the key memory 104, as depicted in diamond 220. If the key is not available, then the receive parser 98 may return to block 204 and thus, pass control of further processing of the packet to the stack.

Figure 10:
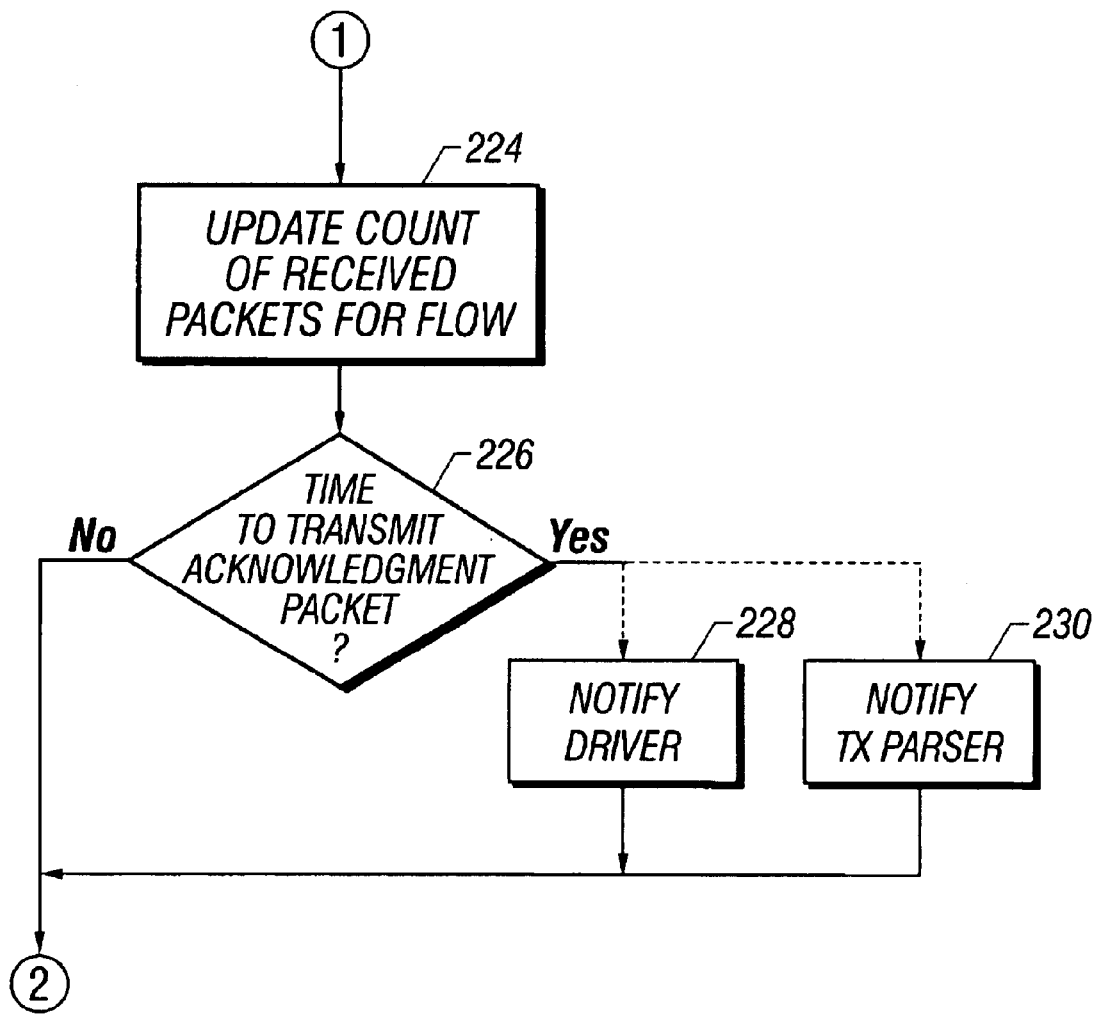

Referring to FIG. 10, if the key is available, the receive parser 98 may update a count of the number of received packets for the associated flow, as depicted in block 224. Next, the receive parser 98 may determine (diamond 226) whether it is time to transmit an acknowledgment packet back to the sender of the packet based on the number of received packets in the flow. In this manner, if the count exceeds a predetermined number that exceeds the window (i.e., if the amount of unacknowledged transmitted data exceeds the window), then the receive parser 98 may either (depending on the particular embodiment) notify (block 228) the driver program 57 (see FIG. 4) or notify (block 230) the transmit parser 114 of the need to transmit an acknowledgment packet. Thus, in the latter case, the transmit parser 114 may be adapted to generate an acknowledgment packet, as no data for the data portion may be needed from the application layer. The receive parser 98 transitions from either block 228 or 230 to diamond 200 to check for another received packet. After an acknowledgment packet is transmitted, the receive parser 98 may clear the count of received packets for that particular flow.

Figure 11:
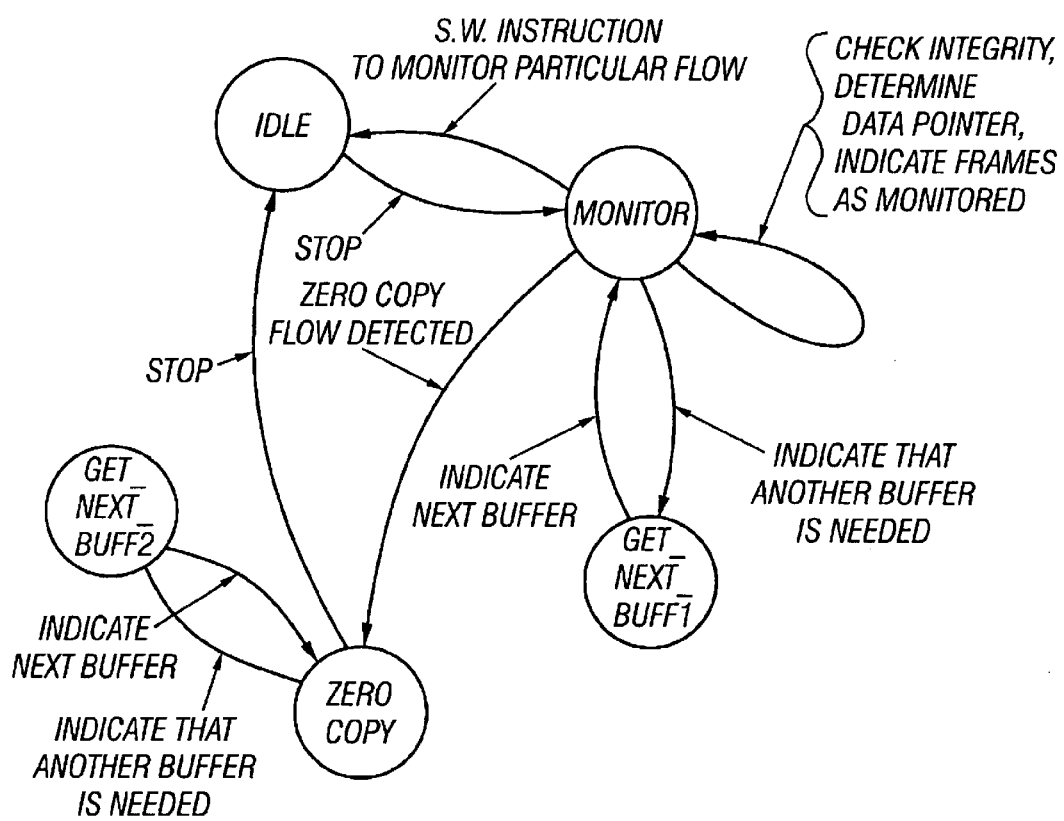
FIG. 11 is a flow diagram illustrating operation of a zero copy parser of the network controller of FIG. 5.

Referring to FIG. 11, in some embodiments, the zero copy parser 110 may include one or more state machines, timer(s) and counter(s) to perform the following functions to transfer the packet data directly to the buffers 304. First, the zero copy parser 110 may determine if control of the transfer needs to be synchronized between the zero copy parser 110 and the stack. In this context, the term "synchronization" generally refers to communication between the stack and the zero copy parser 110 for purposes of determining a transition point at which one of the entities (the stack or the zero copy parser 110) takes control from the other and begins transferring data into the buffers 304. Without synchronization, missing packets may not be detected. Therefore, when control passes from the stack to the parser 110 (and vice versa), synchronization may need to occur, as depicted in block 254.

Figure 12:
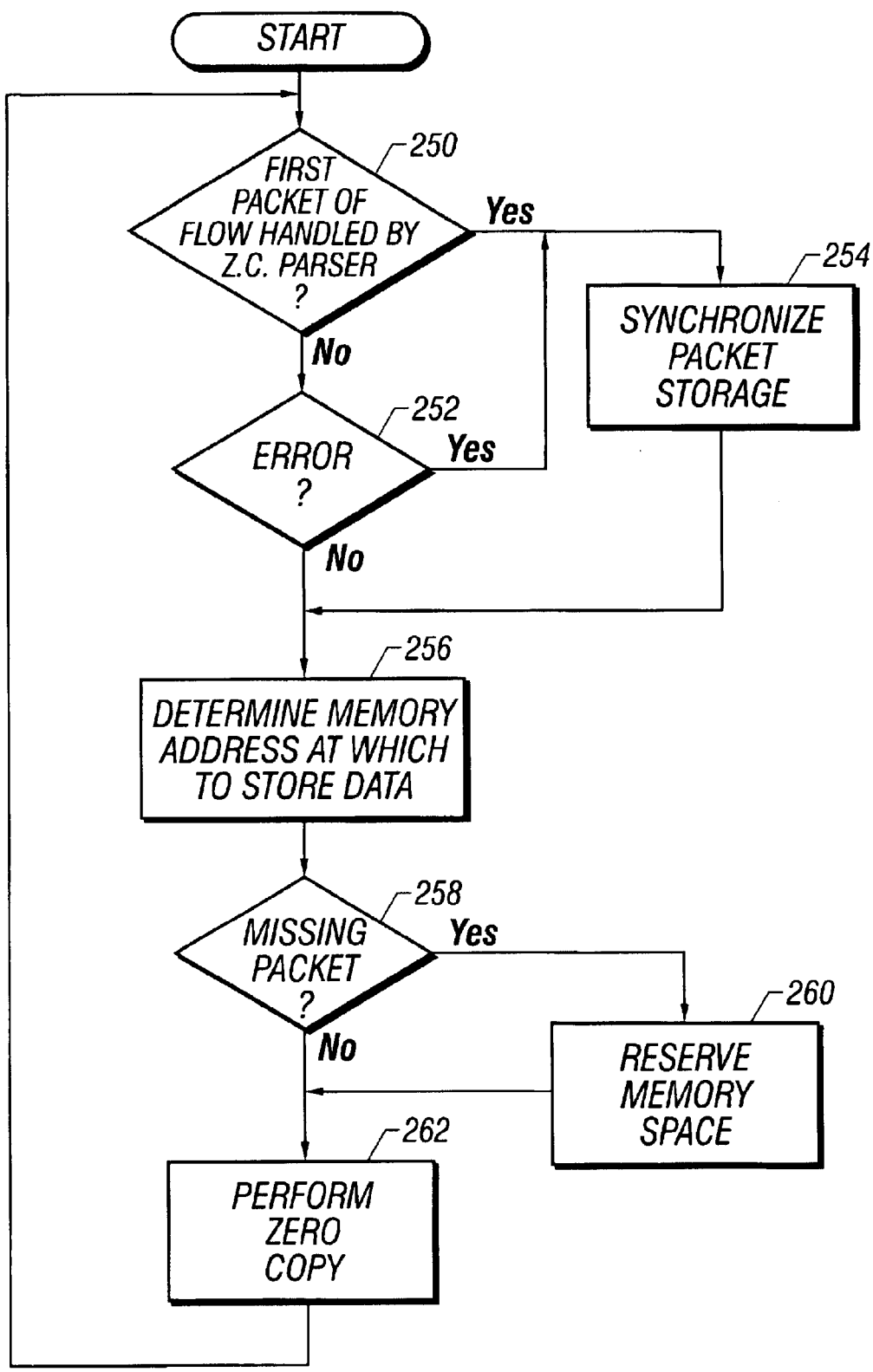

Thus, one scenario where synchronization may be needed is when the zero copy parser 110 initially takes over the function of directly transferring the data portions into the buffers 304. Referring to FIG. 12, if the zero copy parser 110 determines (diamond 250) that the current packet is the first packet being handled by the zero copy parser 110, then the parser 110 synchronizes the packet storage, as depicted by block 254. For purposes of determining when the transition occurs, the zero copy parser 110 may continually monitor the status of a bit that may be selectively set by the driver program 57, for example. Another scenario where synchronization is needed is when an error occurs when the zero copy parser 110 is copying the packet data into the buffers 304. For example, as a result of the error, the stack may temporarily resume control of the transfer before the zero copy parser 110 regains control. Thus, if the zero copy parser 110 determines (diamond 252) that an error has occurred, the zero copy parser 110 may transition to the block 254.

Synchronization may occur in numerous ways. For example, the zero copy parser 110 may embed a predetermined code into a particular packet to indicate to the stack that the zero copy parser 110 handles the transfer of subsequent packets. The stack may do the same.

Occasionally, the incoming packets of a particular flow may be received out of sequence. This may create a problem because the zero copy parser 110 may store the data from sequential packets one after the other in a particular buffer 304. For example, packet number "267" may be received before packet number "266," an event that may cause problems if the data for packet number "267" is stored immediately after the data for packet number "265." To prevent this scenario from occurring, in some embodiments, the zero copy parser 110 may reserve a region 308 (see FIG. 7) in the particular buffer 304 for the missing packet data, as indicated in block 260 (FIG. 12). For purposes of determining the size of the missing packet (and thus, the amount of memory space to reserve), the zero copy parser 110 may use the sequence numbers that are indicated by the adjacent packets in the sequence. In this manner, the sequence number indicates the byte number of the next successive packet. Thus, for the example described above, the acknowledgment numbers indicated by the packet numbers "265" and "267" may be used to determine the boundaries of the region 308.

The zero copy parser 110 subsequently interacts with the PCI interface 130 to set up the appropriate DMA channel to perform a zero copy (step 262) of the packet data into the appropriate buffer 304. The zero copy parser 110 determines the appropriate buffer 304 via the destination port that is provided by the receive parser 98.

Referring back to FIG. 4, besides the network controller 52, the computer system 50 may include a processor 54 that is coupled to a host bus 58. In this context, the term "processor" may generally refer to one or more central processing units (CPUs), microcontrollers or microprocessors (an X86 microprocessor, a Pentium microprocessor or an Advanced RISC Controller (ARM), as examples), as just a few examples. Furthermore, the phase "computer system" may refer to any type of processor-based system that may include a desktop computer, a laptop computer, an appliance or a set-top box, as just a few examples. Thus, the invention is not intended to be limited to the illustrated computer system 50 but rather, the computer system 50 is an example of one of many embodiments of the invention.

The host bus 58 may be coupled by a bridge, or memory hub 60, to an Advanced Graphics Port (AGP) bus 62. The AGP is described in detail in the Accelerated Graphics Port Interface Specification, Revision 1.0, published in Jul. 31, 1996, by Intel Corporation of Santa Clara, Calif. The AGP bus 62 may be coupled to, for example, a video controller 64 that controls a display 65. The memory hub 60 may also couple the AGP bus 62 and the host bus 58 to a memory bus 61. The memory bus 61, in turn, may be coupled to a system memory 56 that may, as examples, store the buffers 304 and a copy of the driver program 57.

The memory hub 60 may also be coupled (via a hub link 66) to another bridge, or input/output (I/O) hub 68, that is coupled to an I/O expansion bus 70 and the PCI bus 72. The I/O hub 68 may also be coupled to, as examples, a CD-ROM drive 82 and a hard disk drive 84. The I/O expansion bus 70 may be coupled to an I/O controller 74 that controls operation of a floppy disk drive 76 and receives input data from a keyboard 78 and a mouse 80, as examples.

Other embodiments are within the scope of the following claims. For example, a peripheral device other than a network controller may implement the above-described techniques. Other network protocols and other protocol stacks may be used.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method for controlling frame transmission comprising:
assigning a time based transmission priority to a plurality of frames;
monitoring the time;
selecting a frame for transmission based on the time and the time based transmission priority;
providing at least two transmission queues one having a higher priority than the other;
modifying a queue;
obtaining the location of the next packet to be processed by one of said queues; and
suspending modifying the next packet in the queue while the current packet is being processed.

2. The method of claim 1 including modifying the queue to expedite the transmission of one packet ahead of another packet.

3. A computer system comprising:
a processor; and
a peripheral device including a scheduler to process a plurality of frames in an order determined by an assigned priority level and time stamp, said peripheral device including a timer and a comparator that compares the assigned time based priority to the current time and based on said comparison transmits the frame or buffers the frame.

4. The system of claim 3 wherein said peripheral device includes a first and a second queue, the first queue being for higher priority frames and a second queue being for lower priority frames.

5. The system of claim 3 including a timer that is synchronized to a system timer.

6. A method comprising:
providing at least two transmission queues of different transmission priorities;
obtaining the location of the next packet to be processed in one of said queues; and
suspending action on said next packet while a current packet is being processed for transmission.

7. The method of claim 6 including modifying the queue to expedite the transmission of one packet ahead of another packet.

8. The method of claim 7 including suspending the modifying of the queue to expedite the transmission of one packet ahead of another packet while a current packet is being processed.

9. The method of claim 6 including assigning a time based transmission priority to a plurality of frames, monitoring the time, and selecting a frame for transmission based on the time and the time based transmission priority.

10. A peripheral device for a computer system comprising:
a scheduler to assign frames to one of at least two transmission queues having different transmission priorities, said scheduler to process a plurality of frames for transmission in an order determined by an assigned priority level and a received time stamp;
a timer; and
a comparator to compare the assigned time based priority to the current time and based on said comparison either transmit the frame or buffer the frame.

11. The device of claim 10 including a device to monitor the current time, said comparator to compare the current time to the time based transmission priority and based on said comparison either transmit or buffer the frame.

12. The device of claim 10 wherein said scheduler assigns a priority based on a quality of service agreement.

13. The device of claim 10 wherein said scheduler assigns a priority based on a class of service policy.

14. The device of claim 10 wherein said scheduler assigns a priority based on available bandwidth.

* * * * *